United States Patent [19]

Matsumoto

[11] Patent Number: 5,280,517
[45] Date of Patent: Jan. 18, 1994

[54] STORAGE APPARATUS WHICH CONTROLS THE USAGE OF A STORAGE MEDIUM

[75] Inventor: Koichi Matsumoto, Tokyo, Japan

[73] Assignee: Canon Kabushiki Kaisha, Tokyo, Japan

[21] Appl. No.: 723,722

[22] Filed: Jun. 20, 1991

Related U.S. Application Data

[63] Continuation of Ser. No. 381,305, Jul. 18, 1989, abandoned.

[30] Foreign Application Priority Data

Jul. 29, 1988 [JP] Japan .................... 63-189802

[51] Int. Cl.⁵ .................................... H04M 1/64
[52] U.S. Cl. ........................... 379/70; 360/6; 360/721; 360/722; 379/68
[58] Field of Search ............ 360/6, 60, 137, 69, 360/72.1, 31, 72.2; 379/67, 68, 69, 70, 74, 77

[56] References Cited

U.S. PATENT DOCUMENTS

| | | | |
|---|---|---|---|
| 4,400,586 | 8/1983 | Hanscom | 379/77 |
| 4,593,337 | 6/1986 | Leone et al. | 360/137 |
| 4,794,474 | 12/1988 | Dwyer | 360/72.2 |
| 4,860,338 | 8/1989 | Waldman | 379/72 X |
| 5,050,031 | 9/1991 | Weiley | 360/137 |
| 5,126,889 | 6/1992 | Walden | 360/53 |

Primary Examiner—James L. Dwyer
Assistant Examiner—Daniel S. Hunter
Attorney, Agent, or Firm—Fitzpatrick, Cella, Harper & Scinto

[57] ABSTRACT

A storage apparatus capable of storing information in accordance with the history of use of the storage medium employed therewith. Control is performed in accordance with the history of reproduction from the storage medium and with the number of times storage operations have been performed on the storage medium. New storage operations are arranged to avoid those portions of the storage medium which have been used frequently. The apparatus may be used in conjunction with a telephone answering machine.

35 Claims, 7 Drawing Sheets

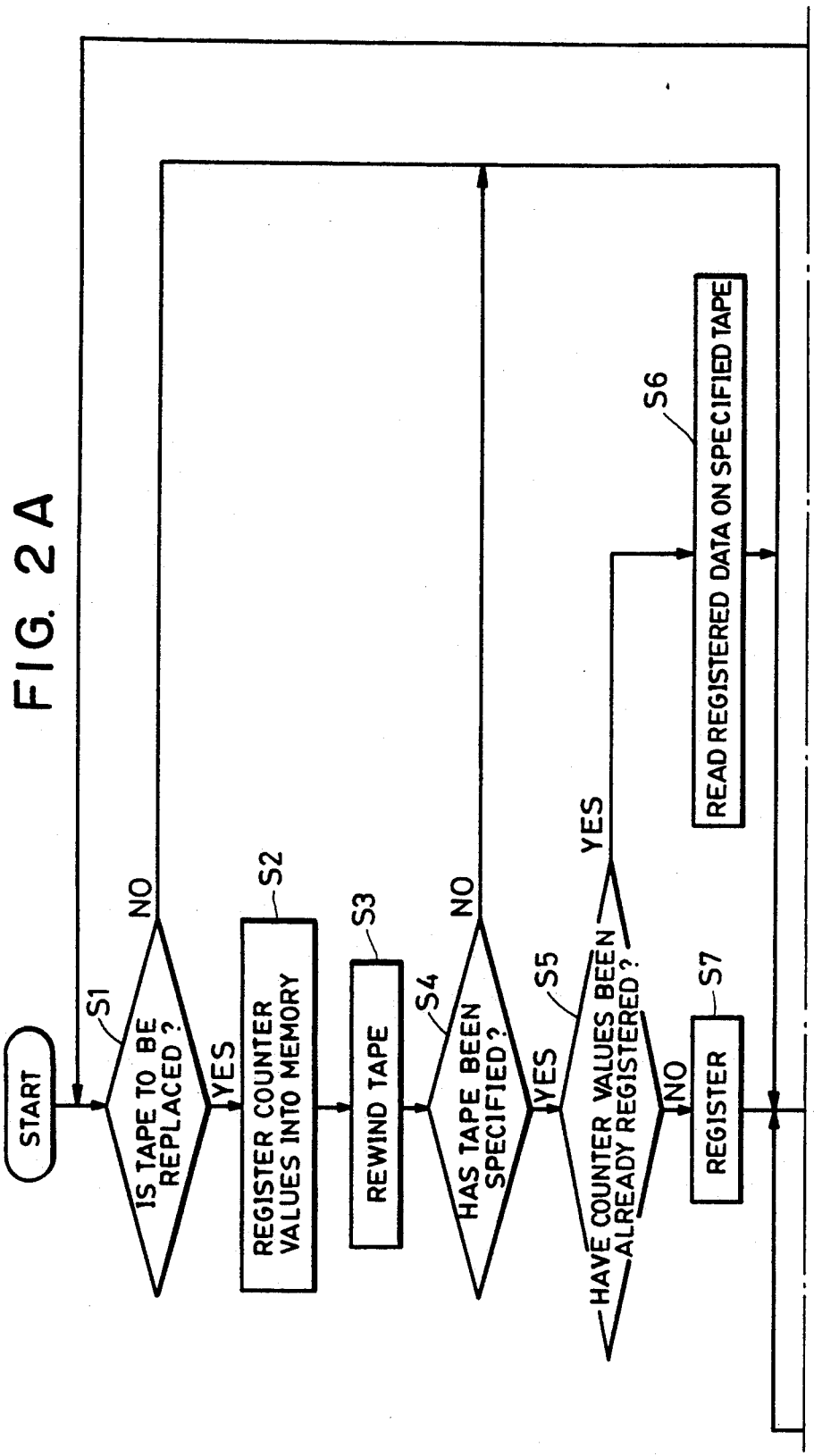

FIG. 4

| 41 TAPE NUMBER | 7 START COUNTER VALUE | 8 END COUNTER VALUE | 44 POSITIONS OF TAPE | 45 NUMBER OF TIMES USED | 46 REWINDING POSITION | 47 REFERENCE NUMBER OF TIMES |
|---|---|---|---|---|---|---|
| 2 | 261 | 823 | 1 | 5 | | 5 |
| | | | 2 | 5 | | |
| | | | 3 | 4 | 0 | |
| | | | 4 | 3 | | |
| | | | 5 | 3 | | |
| | | | .... | .... | | |

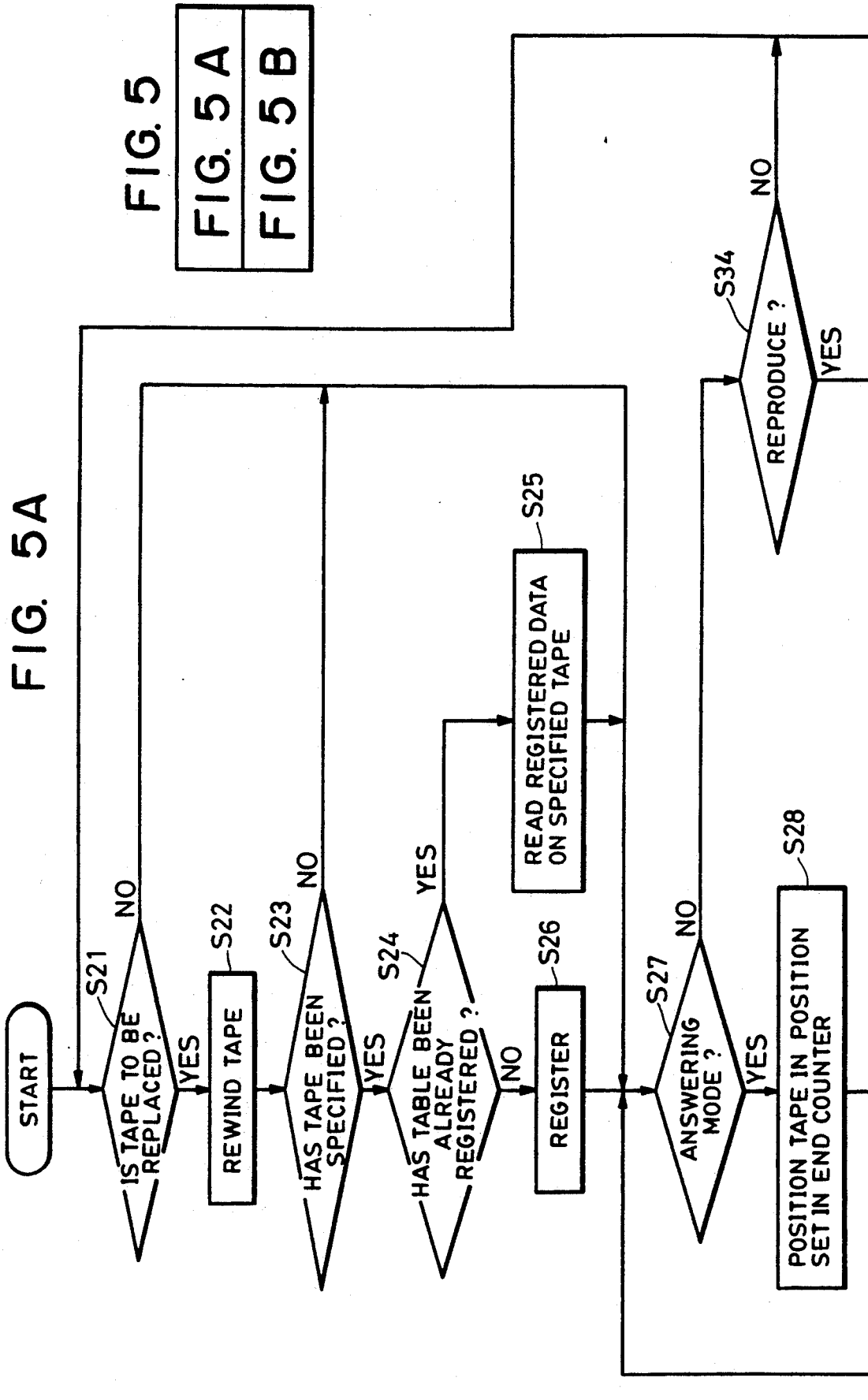

ns have been registered, it is assumed that new
STORAGE APPARATUS WHICH CONTROLS THE USAGE OF A STORAGE MEDIUM This application is a continuation of application Ser. No. 07/381,305 filed Jul. 18, 1989, now abandoned.

BACKGROUND OF THE INVENTION

1. Field of the Invention

The present invention relates to a storage apparatus capable of storing information using again a region of a storage medium where information has already been stored.

2. Description of the Prior Art

A conventional storage apparatus such as a cassette tape storage apparatus used in an answering machine operates in such a manner that, when the answering mode is set by the user, the tape is invariably rewound until its leading end is positioned at the start position. When there is a phone call during the user's absence, a recording mode is entered whereby the tape runs to allow recording.

In this way, it is often the case with a conventional storage apparatus that the leading end portion of the tape is used very frequently. As a result, the leading portion of the tape tends to become worn, and thus to have its performance degraded. If such is the case, the tape itself may become unsuitable for further use.

SUMMARY OF THE INVENTION

An object of the present invention is to overcome the above-stated drawbacks of the prior art.

Specifically, it is an object of the present invention to prolong the usable life of a storage medium.

It is another object of the present invention to avoid any localized overuse of any part of a storage medium.

It is yet another object of the present invention to provide an answering machine in which the useful life of a storage medium for recording incoming messages from the callers is prolonged.

It is a further object of the present invention to provide an answering machine capable of recording an incoming message from the caller at an optimum position on a storage medium.

The above and other objects, features and advantages of the present invention will be apparent from the following detailed description of the preferred embodiments thereof, taken in conjunction with the accompanying drawings.

BRIEF DESCRIPTION OF THE DRAWINGS

FIG. 4 is a view showing a tape use frequency table used in the second embodiment.

DESCRIPTION OF THE PREFERRED EMBODIMENTS

Figure 1:
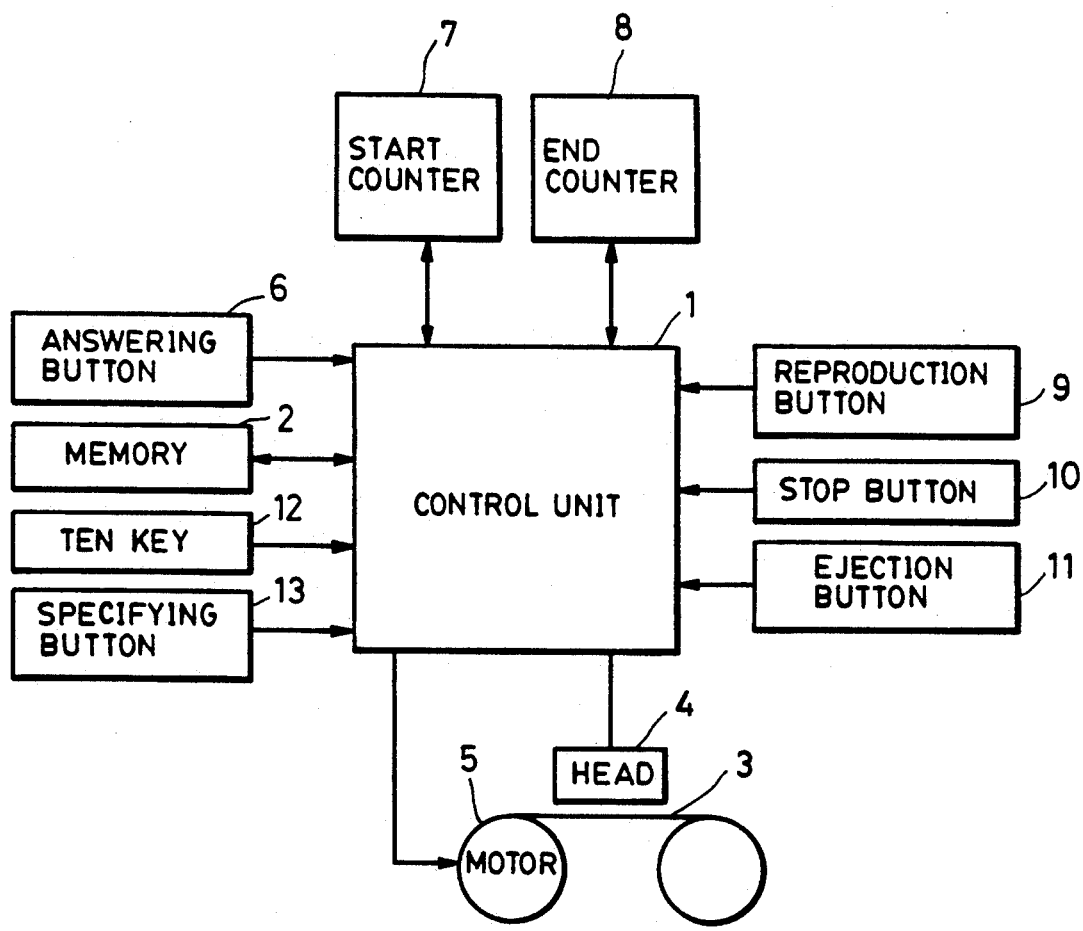
FIG. 1 is a view showing the structure of a first embodiment of the present invention.

FIG. 1 shows the structure of a storage apparatus in accordance with a first embodiment of the present invention. The apparatus includes a control unit 1, a memory 2, a magnetic tape 3 on which speech and other audio information can be stored, a magnetic head 4 for recording and reproducing audio information on and from the magnetic tape 3, and a motor 5 for causing rotation and running of the magnetic tape 3. The apparatus also includes an answering button 6 for commanding the control unit 1 to set the apparatus in an answering mode, a start counter 7 for counting to locate the start position of that region of the magnetic tape 3 from which reproduction has not yet been effected, and an end counter 8 for counting to locate the position of that region of the magnetic tape 3 on which recording has already been completed. The control unit 1 generates drive pulses for driving the motor 5. Each of the counters 7 and 8 counts these drive pulses. The apparatus further includes a reproduction button 9 for commanding the control unit 1 to reproduce information from the magnetic tape 3, a stop button 10 for commanding the control unit 1 to stop the motion of the magnetic tape 3, an ejection button 11 for commanding the unit 1 to eject the magnetic tape 3, a ten-key pad 12 (hereinafter "ten key"), and a specifying button 13.

Thus, the apparatus of this embodiment is provided with the magnetic tape 3 which serves as a storage medium where information may be stored, the motor 5 for causing the rotation of the magnetic tape 3, the magnetic head 4 for storing information on the magnetic tape 3, a control unit 1 for driving the motor 5 during storage by the magnetic head 4, and the end counter 8 for storing data on the position of the region in which storage of information on the magnetic tape 3 has been effected. The apparatus has an arrangement in which the control unit 1 controls the motor 5 on the basis of the data stored by the end counter 8 in a manner which allows the positions at which information is stored on the magnetic tape 3 to be evenly distributed.

Figure 2B:
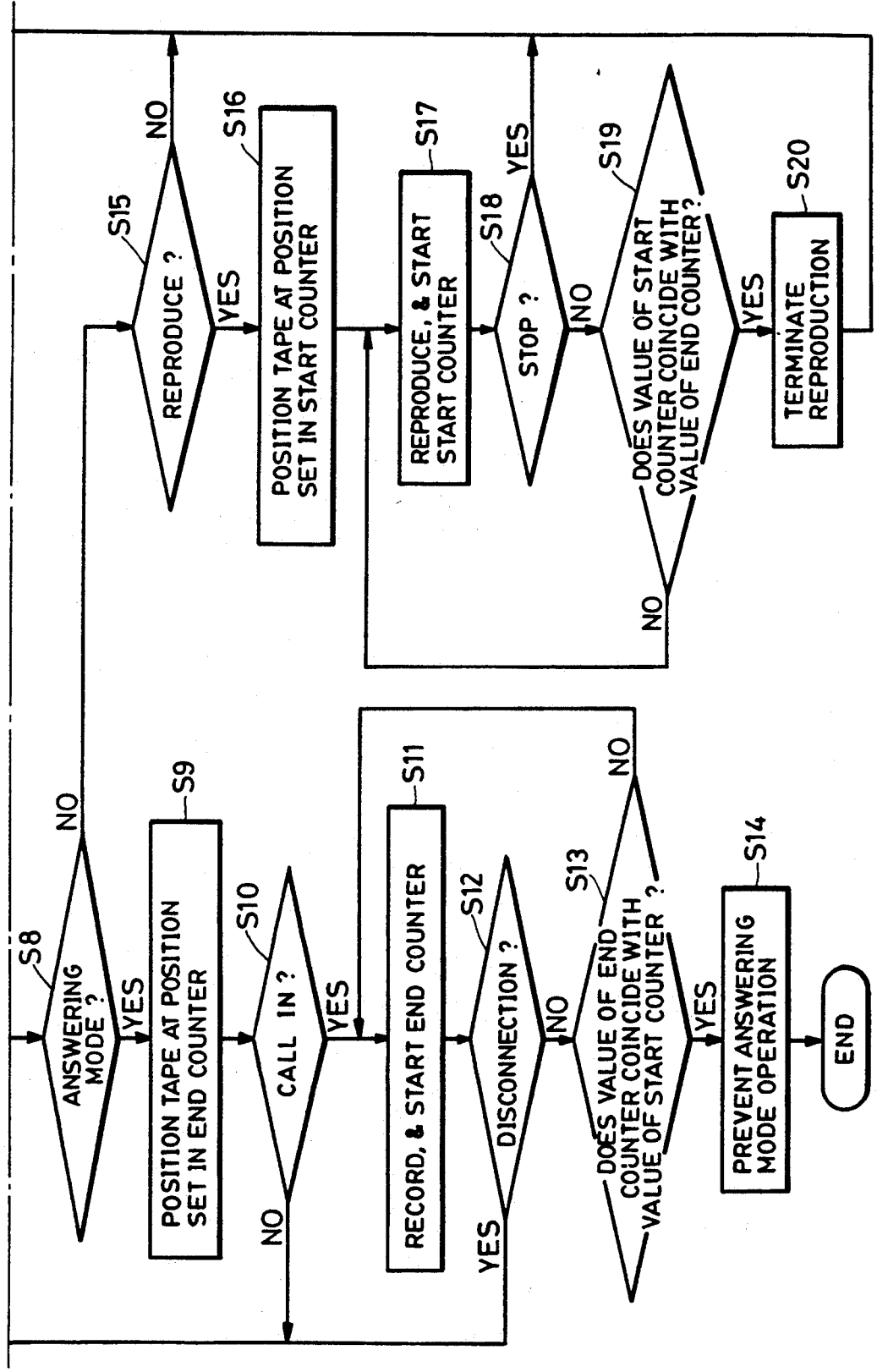
FIG. 2, consisting of FIGS. 2A and 2B, is a flowchart showing the operation of the first embodiment.

FIG. 2 is a flowchart showing the operation of the apparatus in accordance with this embodiment.

If the control unit 1 detects, in executing Step S1, that the user has depressed the ejection button 11 and thus commanded that a tape serving as the magnetic tape 3 be ejected, the values of the start counter 7 and the end counter 8 are registered in a predetermined area of the memory 2 (Step S2). By virtue of this arrangement, when a plurality of magnetic tapes are interchangeably used as the magnetic tape 3, it is possible to preserve the results of their previous use.

When a new magnetic tape has been set as the magnetic tape 3, the control unit 1 drives the motor 5 to rewind the tape 3 (Step S3). This allows the counters 7 and 8 to start counting using as their reference point the leading end of the tape 3. When a plurality of tapes are interchangeably used as the magnetic tape 3, the user assigns numbers to these tapes in order to distinguish each of the tapes. If the control unit 1 detects, in executing Step S4, that the user has depressed the specifying button 13 and the ten key 12, a check is made in Step S5 to determine whether or not any counter values are already registered in the memory 2 and in an area corresponding to the depressed keys of the ten key 12. If they are already registered, the counter values are read and then set in the counters 7 and 8 (Step S6). On the other hand, if it is determined in Step S5 that no counter values have been registered, it is assumed that new counter values must be registered, and an area is provided in the memory 2 which corresponds to the depressed keys (Step S7). When this particular tape is ejected in executing Step S1 on a later occasion, the counter values at the time of ejection are stored in that area. When the tape is to be used again, after the execution of Step S5, the values registered in the area corresponding to the depressed keys are set in the counters 7 and 8 by executing Step S6. By virtue of this arrangement, since the values of the counters 7 and 8 are registered, it is possible to use a plurality of tapes interchangeably as the magnetic tape 3.

If the control unit 1 detects, in executing Step S8, that the user has set answering mode by depressing the answering button 6, the unit 1 drives the motor 5 to run the tape 3 until it assumes the position currently set in the end counter 8 (Step S9). The end counter 8 has a value set therein which is indicative of the position at which the previous recording operation was completed. This arrangement makes it possible to prevent the risk of one portion of the magnetic tape 3 being subjected to successive operations of recording audio information.

Thereafter, when the control unit 1 detects, in executing Step S10, that the machine has received a call from another terminal connected via an established telephone line (the machine thus acting as the party "calling-in" the "calling-out" party), the machine sends a message to the calling-out party so that, if there is any message to be left, it can be recorded and stored. Thereafter, the control unit 1 causes the motor 5 to rotate so as to record the message from the calling-out party on the tape 3. Simultaneously, the unit 1 starts the operation of the end counter 8 (Step S11). In this way, the end counter 8 is able to indicate the position at which each recording operation is completed. The control unit 1 operates to continue the recording operation and the operation of the end counter 8 until the unit 1 detects that the telephone line has been disconnected (in Step S12) or that the value of the end counter 8 coincides with the value of the start counter (in Step S13). If the trailing end of the tape 3 has been reached during the recording operation, the control unit 1 operates to rewind the tape 3 so that the recording operation can be continued from the leading end of the tape 3.

The value set in the start counter 7 is indicative of the start position of the region in which reproduction has not yet been effected. If it is determined in executing Step S13 that the value of the end counter 8 coincides with the value of the start counter 7, the recording operation is terminated. This is done for the following reason: Because the region of the tape 3 that is beyond the position indicated by the coincident value is the region from which reproduction has not yet been effected, no recording must take place on this yet-to-be reproduced subsequent region.

If the control unit 1 detects the coincidence of the values of the counters 7 and 8 in step S13, Step S14 is executed, in which the unit 1 operates in the following manner. That is, the unit 1 alters the message which is to be conveyed to the calling-out party when a call is received, so that the caller can be made aware of the fact that it is impossible for any message to be recorded. Also, the control unit 1 turns on a lamp (not shown) so as to warn the user of this fact as well.

If it is detected in executing Step S8 that the answering mode is not set, Step S15 is executed. If the control unit 1 detects in Step S15 that the user has issued a command by way of the reproduction button 9 to reproduce audio information recorded on the tape 3, the unit 1 drives the motor 5 in such a manner as to cause running of the tape 3 until it assumes the position currently set in the start counter 7 (Step S16). This is followed by the execution of Step S17, in which reproduction is performed by driving the motor 5 and the head 4. Since the start counter 7 has a value set therein which is indicative of the start position of the region of the tape 3 from which reproduction has not yet been effected, the reproduction operation can be started exactly at the beginning of the region which is to be subjected to reproduction.

As the reproduction operation begins, the control unit 1 simultaneously starts the operation of the start counter 7. By virtue of this arrangement, it is possible to have the start counter 7 indicate the starting position of the region from which reproduction has not been completed.

The control unit 1 operates to continue the reproduction operation by means of the motor 5 and the head 4 as well as the operation of the start counter 7, until the unit 1 detects that the user has depressed the stop button 10 (in Step S18) or that the value of the start counter 7 coincides with the value of the end counter 8 (in Step S19). If it is determined in Step S19 that the value of the start counter 7 coincides with the value of the end counter 8, it is assumed that the audio information recorded has been reproduced fully. Hence, the motor 5 is stopped and the reproduction operation is terminated (S20).

In this way, according to this embodiment, with the magnetic tape 3 allowing audio information to be recorded thereon, the starting position of the region of the magnetic tape 3 where the reproduction of information has not yet been effected is set in the start counter 7, while the end position of the region of the magnetic tape 3 where the recording of information has been completed is set in the end counter 8. By virtue of this arrangement, even when rewinding and/or reproduction after a recording operation has caused a deviation in the position at which the tape 3 is in contact with the head 4 from the position at which the previous recording was completed, a subsequent recording operation can be started right at the position where the previous recording was completed (in Step S9).

In addition, if a plurality of tapes are used interchangeably, areas corresponding to the individual tapes are provided in the memory 2 (in Step S7), and the positions at which the last recording operation was completed and the last reproduction operation was completed are stored in the memory with respect to each of the tapes when each tape is ejected (in Step S2). When one of the tapes is to be used again, the corresponding area is specified through the ten key 12, the data on the positions which are registered in the area are read therefrom, and the read positions are set in the counters 7 and 8. By virtue of this arrangement, therefore, even when a plurality of tapes are used interchangeably, the position of the tape at which recording or reproduction is to be started can be determined on the bases of data indicative of the condition of previous use of this particular tape.

As described above, according to the foregoing embodiment, because a recording operation is started at the position of the tape 3 at which the previous recording was completed, it is possible to prevent any concentrated use of any localized part of the tape 3.

Figure 3:
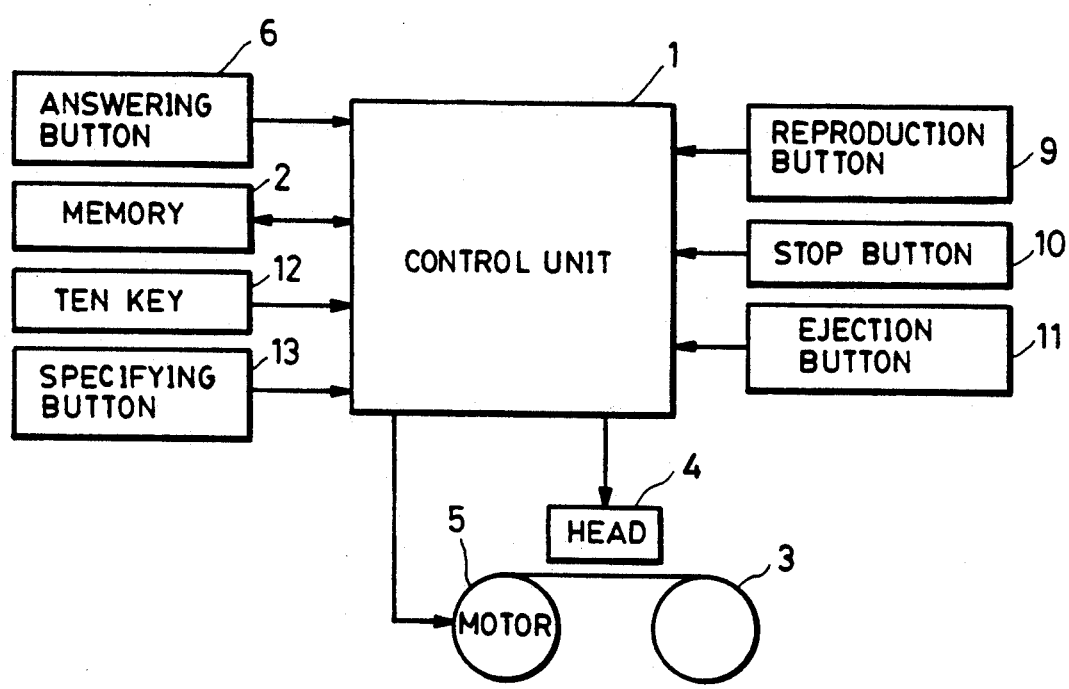
FIG. 3 is a view showing the structure of a second embodiment of the present invention.

FIG. 3 shows the structure of a second embodiment of the present invention.

Component parts which are common with the first embodiment shown in FIG. 1 are denoted by the same reference numerals, and description of these component parts will be omitted.

The memory 2 stores therein a tape use frequency table, such as that shown in FIG. 4. The items registered in the table include the following: tape numbers (col. 41) for specifying a particular tape to be used in the case where a plurality of tapes are used interchangeably; the value of the start counter 7; the value of the end counter 8; positions (col. 44) of the tape; the numbers (col. 45) of times of use at those positions; and a reference number (col. 47) to be compared with each of the numbers of use (col. 45).

This embodiment has the following arrangement: when audio information is to be stored, those regions which have been used a great number of times are avoided by referring to the number of times of prior use (col. 45) registered in the table stored in the memory 2.

Figure 5B:
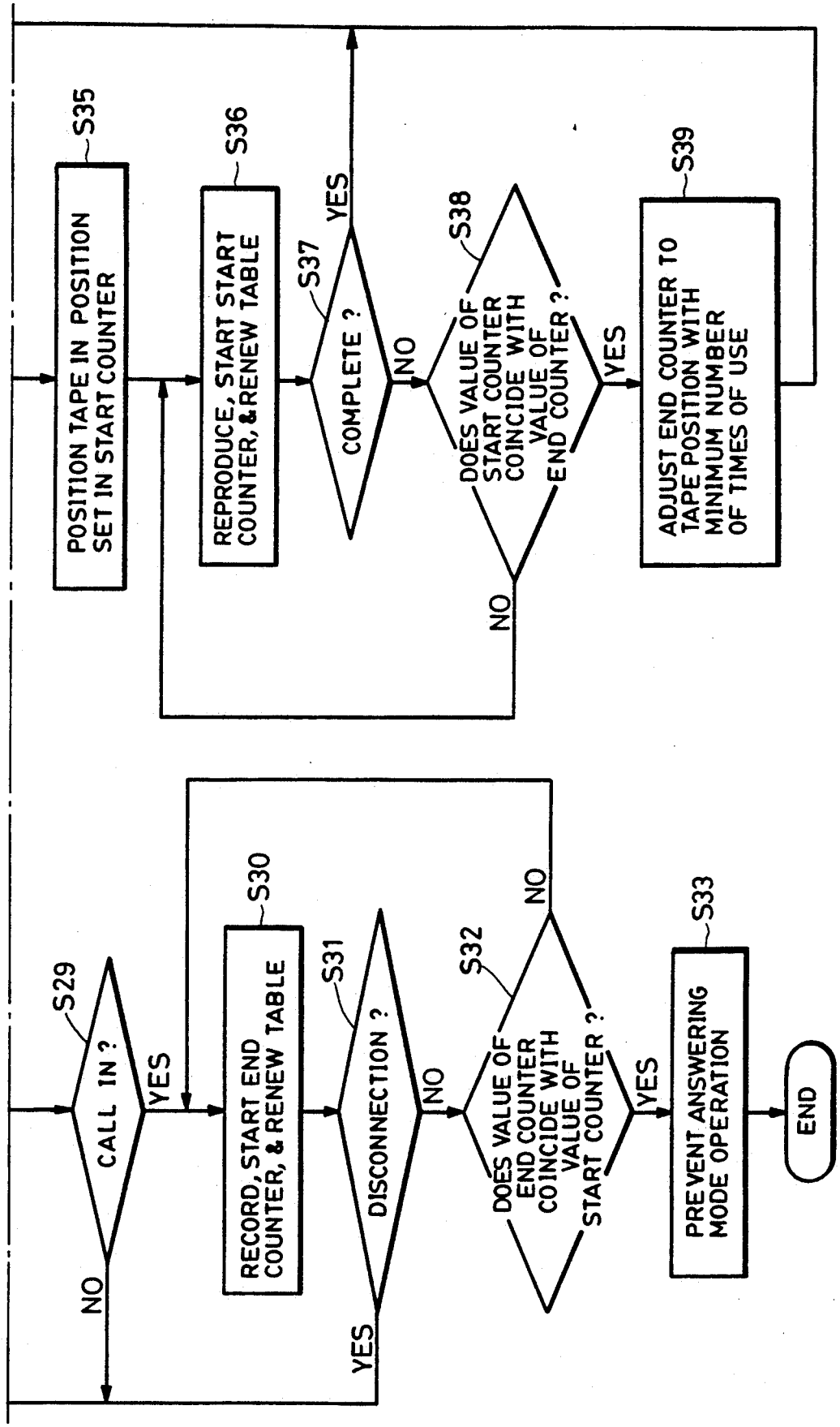
FIG. 5, consisting of FIGS. 5A and 5B, is a flowchart showing the operation of the second embodiment.

FIG. 5 is a flowchart showing the operation of this embodiment.

If the control unit 1 detects, in executing Step S21, that the user has depressed the ejection button 11 and thus commanded that a tape serving as the magnetic tape 3 be ejected, the control unit 1 drives the motor 5 to rewind the tape newly set to serve as the magnetic tape 3 (Step S22). This allows the counters 7 and 8 to start counting using as their reference point the leading end of the tape 3. Subsequently, if the control unit 1 detects, in executing Step S23, that the user has depressed the specifying button 13 and the ten key 12, a check is made in Step S24 to determine whether or not a tape use frequency table is already registered in an area corresponding to the depressed keys of the ten key 12. If one is already registered, the position of the tape 3 at which a recording operation is to be started is determined on the basis of the registered table (Step S25). On the other hand, if it is determined in Step S24 that no table has been registered, it is assumed that a new table must be registered, and an area is provided in the memory 12 which corresponds to the depressed keys (Step S26).

If the control unit 1 detects, in executing Step S27, that the user has set the answering mode by depressing the answering button 6, the unit 1 drives the motor 5 to run the tape 3 until it assumes the position currently set in the end counter 8 (Step S28). In the case where the reproduction of all the recorded messages has already been effected, the end counter 8 indicates a particular tape position which is, among all those tape positions 44 which have not yet been used enough times to have reached the reference number 47, the one closest to the leading end of the tape 3 (this position is therefore the next position designated by the largest number in the table). In the example shown in FIG. 4, this tape position is the position numbered 3. In the case where reproduction of all the recorded messages has not yet been effected, the end counter 8 indicates the end position of a region with respect to which reproduction has already been completed. This arrangement provides the following advantages. In the case where reproduction has been effected, it is possible to start a recording operation at a position selected to avoid positions which have been used frequently. In the case where reproduction has not been completed, it is possible to start a recording operation at the starting position of a region which need not be subjected to reproduction.

Thereafter, when the control unit 1 detects, in executing Step S29, that the machine has received a call from another terminal connected via an established telephone line, the machine sends a message to the calling-out party so that, if there is any message to be left, it can be recorded and stored. Thereafter, the control unit 1 causes the motor 5 to rotate so as to record the message from the calling-out party on the tape 3. Simultaneously, the unit 1 starts the operation of the end counter 8. In this way, the end counter 8 is able to indicate the position at which each recording operation is completed. Also at this time, the number of times of use (col. 45) corresponding to a tape position (col. 44) is renewed by incrementing the number in col. 45 by one each time the head 4, operating to store audio information on the tape 3, passes one of the positions on the tape 3 which are registered as the tape positions in col. 44 (Step S30). The control unit 1 operates to continue the recording operation, the operation of the end counter 8, and the renewal of the numbers of times of use until the unit 1 detects that the telephone line has been disconnected (in Step S31) or that the value of the end counter 8 coincides with the value of the start counter (in Step S32). If the trailing end of the tape 3 has been reached during the operation of recording audio information, the control unit 1 operates to rewind the tape 3 so that the recording operation can be continued from the leading end of the tape 3.

The start counter 7 has a value set therein that is indicative of the starting position of a region with respect to which reproduction has not yet been effected. If it is determined in executing Step S32 that the value of the end counter 8 coincides with the value of the start counter 7, the recording operation is terminated. This is done for the following reason: Because the region of the tape 3 that is beyond the position indicated by the coincident value is a region from which reproduction has not yet been effected, no recording must take place on this yet-to-be reproduced subsequent region.

If the control unit 1 detects the coincidence of the values of the counters 7 and 8 in step S32, Step S33 is executed, where the unit 1 operates in the following manner. That is, the unit 1 alters the message which is to be conveyed to the calling-out party when a call is received, so that the caller can be made aware of the fact that it is impossible for any message to be recorded. Also, the control unit 1 turns on a lamp (not shown) so as to warn the user of this fact as well.

If it is detected in executing Step S27 that the answering mode is not set, Step S34 is executed. If the control unit 1 detects in Step S34 that the user has issued a command by way of the reproduction button 9 to reproduce audio information recorded on the tape 3, the unit 1 drives the motor 5 in such a manner as to cause running of the tape 3 until it assumes the position currently set in the start counter 7 (Step S35). This is followed by the execution of Step S36, in which reproduction is performed by driving the motor 5 and the head 4. Since the start counter 7 has a value set therein which is indicative of the start position of a region of the tape 3 from which reproduction has not yet been effected, the reproduction operation can be started exactly at the beginning of a region which is to be subjected to reproduction.

As the reproduction operation begins, the control unit 1 simultaneously starts the operation of the start counter 7. By virtue of this arrangement, it is possible to have the start counter 7 indicate the starting position of another region from which reproduction has not yet been effected.

Also in Step S36, the control unit 1 operates to renew the number of times of use (col. 45) corresponding to a tape position (col. 44) by incrementing the number in col. 45 by one each time the head 4, operating to reproduce audio information from the tape 3, passes one of the positions of the tape 3 which are registered as the tape positions in col. 44. The control unit 1 operates to continue the reproduction operation, the operation of the start counter 7, and the renewal of the numbers of times of use until the unit 1 detects that the user has depressed the stop button 10 (in Step S37) or that the value of the start counter 7 coincides with the value of the end counter 8 (in Step S38). If it is determined in executing Step S38 that the value of the start counter 7 coincides with the value of the end counter 8, it is assumed that the audio information recorded has been reproduced fully. Hence, the motor 5 is stopped and the reproduction operation is terminated.

When the control unit I detects in Step S38 that the values of the counters 7 and 8 coincide with each other, Step S39 is executed, in which the control unit 1 adjusts the end counter 8 to the position next to the tape position corresponding to the maximum number of times of use in col. 45. In the example shown in FIG. 4, the counter 8 is adjusted to the tape position numbered 3. This adjustment is performed in the following manner. The control unit 1 sequentially compares the individual numbers of times of use in col. 45 with the reference number in col. 47, and set in the end counter 8 the first tape position from col. 44 which has not been used enough times to have reached the reference number in col. 47. If there is no such tape position which has not been used enough times to have reached the reference number in col. 47, the reference number is incremented by one, and this new reference number is compared with each of the tape positions in col. 44, starting with the first.

As described above, according to the foregoing embodiment, each time an audio information recording or reproduction operation is effected by means of the head 4, the number in col. 45 which is indicative of the number of times the corresponding region has been used and which is stored in the memory 2 is renewed, and, at the time of the next recording operation, the position at which the recording operation is to be started is determined on the basis of the number of times of use stored in the memory 2 (col. 45). By virtue of this arrangement, it is possible to prevent any localized concentration of recording or reproduction operations in any region of the storage medium. With this arrangement, therefore, the position at which recording is performed can be evenly distributed along the length of the storage medium. Accordingly, no particular part of the storage medium will deteriorate, thereby making it possible to prevent any risk of the usable life of the storage medium being curtailed, this being one of the various advantages provided by the embodiment.

In the foregoing embodiment, each recording operation is started at the position next to the position which has been used a large number of times. However, even if the arrangement of the embodiment is such that a recording operation is started at a position which has been used a small number of times, it is also possible to prevent any particular part of the tape from deteriorating.

Further, although in the foregoing embodiment, the table is renewed both at the time of each recording operation and at the time of each reproduction operation, the renewal of the table may alternatively be effected solely at the time of a recording operation, or solely at the time of a reproduction operation.

In the foregoing embodiment, since a recording operation is not started at the leading end of the tape, the start counter is adapted to hold therein, as the position at which the forthcoming recording operation is to be started, the starting position of a region with respect to which reproduction has not yet been effected.

Although in the above-described first and second embodiments, audio information from the calling-out party is stored, the present invention is also applicable to the storage of image information if the incoming call is from a video telephone capable of transmitting image information.

Further, the type of information which can be stored by application of the present invention is not limited to information transmitted via telephone lines. The present invention is also applicable to the storage of audio and video information transmitted through radio or TV broadcasting systems.

Although in the above-described first and second embodiments, information is stored on a magnetic tape, the present invention can be effectively applied to the storage of information on any type of storage medium whose storage performance may deteriorate due to being repeatedly subjected to storage and reproduction operations. Examples of such media are magnetic disks and rewritable optical cards.

While the preferred embodiments of the present invention have been described, the present invention is not limited thereto and various modifications and changes may be made within the scope of the following claims.

What is claimed is:

1. A storage apparatus comprising:
   storage and reproduction means for storing information on a storage medium and for reproducing the information from the storage medium;
   holding means for holding data continuously updated when reproducing information by said storage and reproduction means; and
   control means for controlling which region on the storage medium the information is to be stored by said storage and reproduction means in accordance with the continuously updated data held by said holding means,
   wherein the continuously updated data held by said holding means includes the number of times reproduction has been performed by said storage and reproduction means at each of a plurality of regions of the storage medium.

2. A storage apparatus according to claim 1, wherein said control means controls the position on the storage medium at which said storage and reproduction means stores information.

3. A storage apparatus according to claim 1, wherein said control means causes said storage and reproduction means to store information in a region where reproduction has been performed a small number of times by said storage and reproduction means.

4. A storage apparatus according to claim 1, wherein said storage and reproduction means stores information on a magnetic tape as the storage medium, and said storage and reproduction means reproduces information from the magnetic tape.

5. A storage apparatus comprising:
   storage means for storing information on a storage medium;
   holding means for holiday continuously updated data indicating the number of times storage has been performed by said storage means respectively at each of a plurality of regions of the storage medium independent of other regions of the storage medium; and control means for controlling which region on the storage medium information is to be stored by said storage means in accordance with the continuously updated data held by said holding means.

6. A storage apparatus according to claim 5, wherein said control means controls the region of the storage medium at which said storage means stores information.

7. A storage apparatus according to claim 6, wherein said control means causes said storage means to store information in a region where storage has been performed a small number of times.

8. A storage apparatus according to claim 5, wherein said storage means stores information on a magnetic tape as the storage medium.

9. An answering machine comprising:

recording and reproduction means for recording a message from a calling-out party on a storage medium and for reproducing the message from the storage medium;

holding means for holding data continuously updated when reproducing a message from the storage medium indicating from which region on the storage medium a message has been reproduced by said recording and reproduction means; and restraining means for restraining the recording of a message in a region on the storage medium from which reproducing by said recording and reproduction means has not been performed, in accordance with the data held by said holding means, wherein said restraining means restrains recording by said recording and reproduction means on the storage medium while information is being recorded, when said recording and reproduction means reaches the region on the storage medium from which reproduction has not been performed.

10. An answering machine according to claim 9, wherein said recording and reproduction means records messages on a magnetic tape as the storage medium.

11. A reproduction apparatus comprising:

reproduction means for reproducing information from a storage medium;

memory means for storing data continuously updated when reproducing information from the storage medium indicating from which region of the storage medium reproduction has been completed by said reproduction means; and control means for controlling said reproduction means to start reproduction from a region on the storage medium from which reproduction has not been completed by said reproduction means, in accordance with the data stored by said memory means.

12. A reproduction apparatus according to claim 15, wherein the data stored in said memory means is updated in accordance with reproduction performed by said reproduction means.

13. A reproduction apparatus according to claim 15, wherein said reproduction means reproduces information from a magnetic tape as the storage medium.

14. A reproduction apparatus according to claim 11, wherein said memory means stores data of a plurality of storage medium, and said control means controls said reproduction means in accordance with the data of the selected storage medium.

15. An answering machine according to claim 9, wherein said holding means holds data of a plurality of storage medium, said restraining means restraining recording of the message by said recording and reproduction means in accordance with the data of the selected storage medium.

16. A storage apparatus according to claim 15, wherein said holding means stores data of a plurality of storage medium, said control means controls said storage means in accordance with the data of the selected storage medium.

17. A storage apparatus according to claim 1, wherein said holding means holds data of a plurality of regions of said storage medium, each data is updated every time information is stored.

18. A storage apparatus according to claim 17, wherein said holding means holds data of a plurality of storage medium, said control means controls storage means in accordance with the data of the selected storage medium.

19. A storage apparatus comprising:

recording and reproduction means for recording information on a storage medium and for reproducing the information from the storage medium;

holding means for holding data continuously updated when reproducing information from the storage medium indicating from which region on the storage medium information has been reproduced by said recording and reproduction means; and restraining means for referring to said holding means while information is recorded by said recording and reproduction means and for restraining the recording of information in a region on the storage medium from which reproduction has not been performed by said recording and reproduction means, wherein said restraining means restrains recording by said recording and reproduction means on the storage medium while information is being recorded, when said recording and reproduction means reaches the region on the storage medium from which reproduction has not been performed.

20. A storage apparatus according to claim 19, wherein said recording and reproduction means records information on a magnetic tape as the storage medium.

21. A storage apparatus according to claim 19, wherein said holding means holds data of a plurality of the storage medium, said restraining means restraining recording of information by said recording and reproduction means in accordance with the data of the selected storage medium.

22. A storage apparatus comprising:

writing/reading means for selectively writing and reading information into a plurality of exchangeable storage mediums;

memory means for storing continuously updated data indicating which portions of each of the plurality of exchangeable storage mediums information has been written into or read from; and control means for controlling which portions of each of the plurality of exchangeable storage mediums information is written into by said writing/reading means in accordance with the continuously updated data stored in said memory means relating to the selected exchangeable storage medium.

23. A storage apparatus according to claim 22, wherein said memory means stores the frequency of use of each of a plurality of regions of the storage medium.

24. A storage apparatus according to claim 23, wherein said control means controls said writing/reading means to write information in a region used with lower frequency.

25. A storage apparatus according to claim 22, wherein said memory means stores data indicative of a region in which reproduction has been completed by said writing/reading means, and said control means controls said writing/reading means to write in a region on which information has not been written.

26. A reproduction apparatus comprising:
   a reproduction head for reproducing information from a storage medium;
   memory means for storing data continuously updated when reproducing information from the storage medium indicating from which region of the storage medium reproduction has been completed by said reproduction head; and
   control means for controlling said reproduction head to start reproduction from a region on the storage medium from which reproduction has not been completed by said reproduction head, in accordance with the continuously updated data stored by said memory means.

27. A reproduction apparatus according to claim 26, wherein said memory means stores data of a plurality of storage medium, and said control means controls said reproduction head in accordance with the data of the selected storage medium.

28. A reproduction apparatus according to claim 26, wherein the data stored in said memory means is update in accordance with reproduction performed by said reproduction head.

29. A reproduction apparatus according to claim 26, wherein said reproduction head includes a magnetic head.

30. A storage apparatus comprising:
   storage and reproduction means for storing information on a storage medium and for reproducing the information from the storage medium;
   holding means for holding data continuously updated when reproducing information by said storage and reproduction means; and
   control means for controlling which regions on the storage medium the information is to be stored by said storage and reproduction means in accordance with the continuously updated data held by said holding means,
   wherein the continuously updated data held by said holding means includes the number of times reproduction has been performed by said storage and reproduction means respectively at each of a plurality of regions of the storage medium independent of other regions of the storage medium.

31. A storage apparatus according to claim 5, wherein said holding means counts the number of times storage has been performed in each of the plurality of regions of the storage medium independent of other regions on the storage medium, and said control means controls the region in which the information is stored.

32. A storage apparatus according to claim 22, wherein said control means counts the number of times said writing/reading means writes or reads information at each of a plurality of regions of each of the plurality of exchangeable storage mediums independent of other regions on each of the plurality of exchangeable storage mediums, and wherein said memory means stores the count for each of the plurality of regions of each of the plurality of exchangeable storage mediums and said control means controls the region in which the information is written to or read from each of the plurality of exchangeable storage mediums in accordance with the count stored in said memory means.

33. A storage apparatus according to claim 22, wherein said control means controls a region of the storage medium at which the information is written by said writing/reading means.

34. A storage apparatus according to claim 22, wherein said control means comprises keys for selecting the exchangeable storage medium and for controlling said writing/reading means in accordance with the selection.

35. A storage apparatus according to claim 22, wherein said writing/reading means comprises a magnetic head.

* * * * *

UNITED STATES PATENT AND TRADEMARK OFFICE
CERTIFICATE OF CORRECTION

PATENT NO. : 5,280,517

DATED : January 18, 1994

INVENTOR(S) : KOICHI MATSUMOTO

It is certified that error appears in the above-indentified patent and that said Letters Patent is hereby corrected as shown below:

Column 4, line 56, "bases" should read —basis—.

Column 7, line 16, "unit I" should read —unit 1—.

Column 8, line 67, "holiday" should read —holding—.

Column 9, line 57, "claim 15," should read —claim 11,—.
 line 61, "claim 15," should read —claim 11,—.
 line 66, "medium," should read —media,—.

Column 10, line 3, "medium," should read —media,—.
 line 7, "claim 15," should read —claim 5,—.
 line 9, "medium," should read —media,—.
 line 18, "medium," should read —media,—.
 line 48, "medium," should read —media,—.

Column 11, line 27, "medium," should read —media,—.
 line 31, "update" should read —updated—.

Signed and Sealed this

Thirteenth Day of September, 1994

Attest:

BRUCE LEHMAN

Attesting Officer

Commissioner of Patents and Trademarks